July 19, 1938.  C. LE BLEU  2,124,466
EARTHWORKING IMPLEMENT
Filed Feb. 19, 1936   3 Sheets-Sheet 2
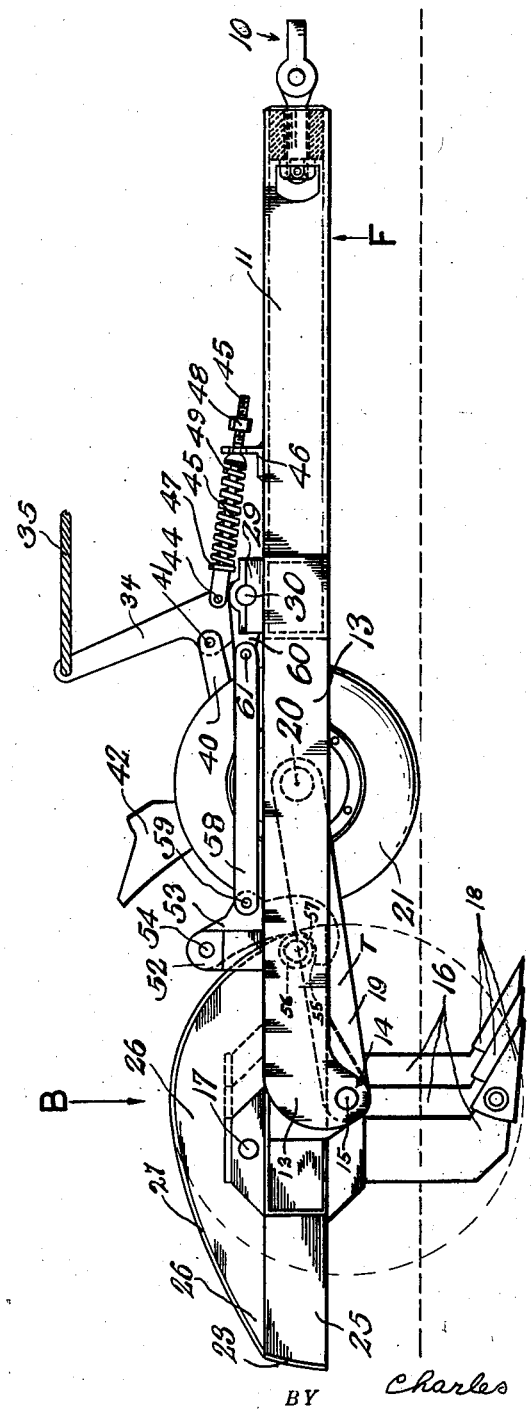
INVENTOR
Charles Le Bleu
BY
ATTORNEY

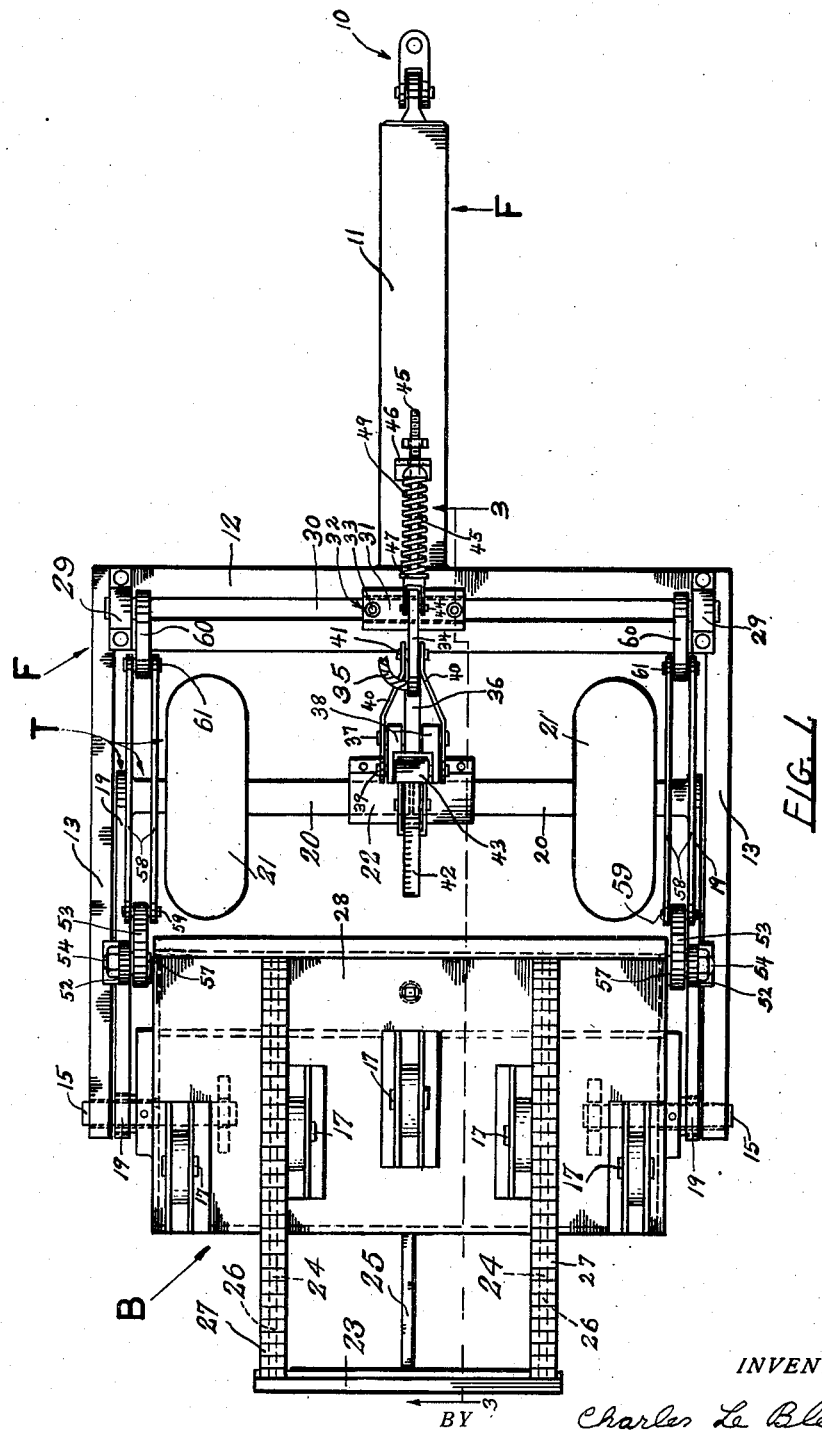

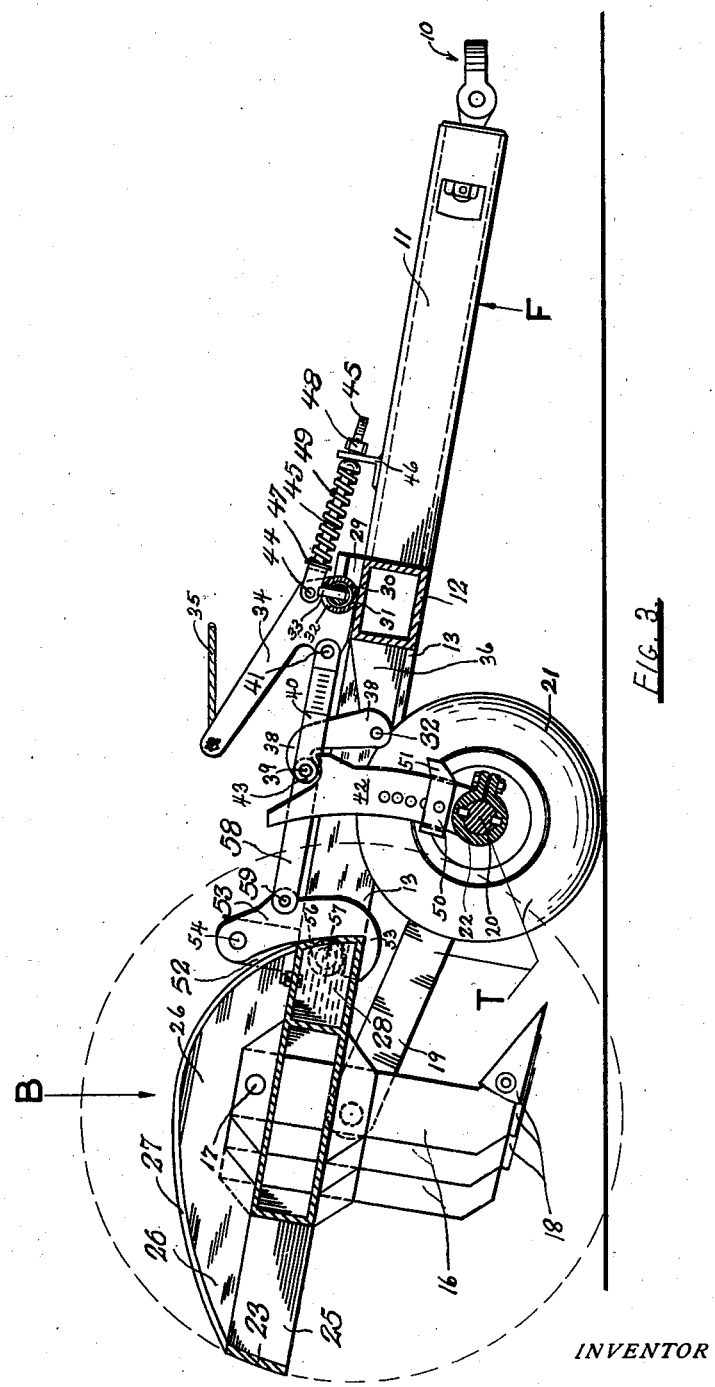

Patented July 19, 1938

2,124,466

UNITED STATES PATENT OFFICE 2,124,466

EARTHWORKING IMPLEMENT

Charles Le Bleu, Los Angeles, Calif.

Application February 19, 1936, Serial No. 64,677

9 Claims. (Cl. 97—74)

This invention relates to earth working implements of the character adapted to be drawn across a surface to be treated to dig and loosen and otherwise cultivate the earth and which implements are commonly termed rippers, rooters, scarifiers, plows, subsoilers, and the like. More specifically the invention relates to improvements in that type of earth working implement comprising a wheeled draft frame adapted at its forward end for connection to a draft device and carrying at its rear end a revoluble element provided with a multiplicity of earth working tools.

The principal object of the invention is the provision in an earth working implement having digging and idle positions, of a draft frame adapted for connection to a draft device, rolling supports for the draft frame positionable relative thereto, a revoluble implement body provided with a plurality of earth working tools disposed on the draft frame for revolving movement and means whereby revolving movement of the implement body from digging position will result in raising the draft frame with respect to the rolling supports and thus cause the earth working implement to assume the idle position, and latch means to releasably retain the draft frame in its raised position relative to the rolling supports and the ground.

The invention also provides certain other features of construction and correlation of parts, members, and features whereby certain important advantages are attained and the device rendered more convenient and advantageous in use as will hereinafter be more fully described and claimed.

In describing my invention in detail, reference will be made to the accompanying drawings wherein like characters of reference denote like or corresponding parts throughout the several views.

In the drawings:

Figure 1 is a plan view of my invention.

Figure 2 is a side elevation of Figure 1.

Figure 3 is a side elevation in section taken on a line 3—3, see Figure 1.

Referring now in detail to the characters of reference on the drawings, my invention as here embodied, for purposes of explanation, comprises in general, a draft frame F adapted at its forward end as shown at 10 for connection to a draft device, and comprises a draft beam 11 attached at its rear end to a cross beam 12. Secured at their forward ends to the ends of cross beam 12 are side frames 13 provided with bearings 14. Journaled in bearings 14 at their outer ends is a shaft 15 secured to the opposite ends of an implement body B provided with a multiplicity of earth working elements E, comprising standards 16 detachably secured at their upper ends to implement body B by pins 17, and provided with detachable ground working tools 18 at their lower ends. Journaled on shafts 15 between the inner sides of side frames 13 and the ends of implement body B is a pair of arms 19 rigid at their forward ends with a multiple section shaft 20 having journaled thereon rolling supports 21. The inner ends of the sections of shaft 20 converge in a coupling clamp 22 keyed thereto for non-rotation therewith, thus forming the shaft 20.

Thus is provided a draft frame F adapted at its forward end for connection to a draft device, supported by a wheeled truck frame journaled therewith for swinging movement relative thereto, and having journaled on its rear end for revolving movement an implement body B.

Implement body B includes a tail piece 23 secured to overhanging members 24 and 25. The implement body B also includes plates 26 provided with arcuate rims 27 which as shown in the drawings, are volute in shape and in relation to the shafts 15 whereby the frame will be progressively raised as the rims roll along the ground. As indicated by the dotted lines of Figures 2 and 3, the tail piece 23 extends outwardly from the pivotal connection of the implement body B with the draft frame F at 15, a greater distance than does the earth working tools 18. It should also be noted that the forward end of implement body B extends substantially the same distance from shafts 15 as does the bottom sides of earth working tools 18 as represented by the dotted line circle in Fig. 2. Volute rims 27 extend from the front side of implement body B arcuately rearwardly to tail piece 23 and described by the dotted line circle indicated in Fig. 3 of the drawings. Thus, it will be readily understood that the implement being in the digging position as shown in Figure 2, if the earth working implement is moved forward and the implement body revolves, the draft frame F will be raised at its rear end to the position shown in Figure 3.

The implement body B is provided with a water-tight counterbalanced compartment 28, see Figure 3, which may contain a quantity of water to attain the desired balance of the implement body B on its pivotal connection with draft frame F. However, other means of attaining the correct balance of implement body B may be used.

Correct balance may be attained by the distribution of metal in the implement body, or by the addition of metal at selected lighter points. The correct balance for maximum clearance of ground working tools 18 when the draft frame F is in the idle position of Figure 3 has been attained when the implement body B balances on its pivotal supports 15 to parallel the bottom sides of ground working tools 18 with a level surface upon which the machine rests, being in the position of Figure 2. As shown in Figure 3, the water compartment 28 is full and therefore the implement body B has revolved until arrested by a control mechanism which will now be described. But, still viewing Figure 3, if the proper quantity of water were removed from compartment 28, the implement body B would assume a position to parallel the under sides of ground working tools 18 with the ground.

The control means for my earth working implement will now be described. Cross beam 12 carries aligned bearings 29. A crank shaft 30 is journaled adjacent its opposite end in bearings 29. Crank shaft 30 carries a sleeve 31 provided with oversize openings 32 disposed about pins 33 carried by crank shaft 30 and formed to permit limited relative rotation of the sleeve and crank shaft. It is obvious that an elongated opening may be used instead of the oversize opening 32 to mount sleeve 31 on crank shaft 30 for limited movement thereon. Sleeve 31 carries a lever 34 provided at its outer end with a pull rope 35 extending forwardly therefrom to the draft device within easy reach of the operator. Secured to cross beam 12 is a bracket 36. Pivotally mounted on bracket 36 at 37 is a pair of spaced apart upstanding arms 38 carrying at their upper ends a pin 39. Pivoted at their rear ends on pin 39 is a pair of spaced apart links 40 pivotally connected at their forward ends at 41 to lever 34. Coupling clamp 22 is provided with an upstanding arm 42 rigid therewith at its lower end and adapted at its upper end to receive a roller 43 journaled on pin 39 between the confronting faces of spaced apart links 40. Pivoted at its rear end on lever 34 at 44 is a rod 45 extending thence forwardly through an opening in bracket 46 secured to the draft frame F. Rod 45 is provided with a shoulder 47 and is adapted at its forward end to receive an adjusting nut 48. Disposed between the confronting faces of shoulder 47 and bracket 46 and encircling rod 45 is a compression spring 49 continuously urging lever 34 to its rearmost position, see Figure 3. Upstanding arm 42 carries an adjustable stop 50 provided with a forward projection 51 adapted to engage roller 43 when the implement is in digging position to limit relative movement as between the truck T and the draft frame F, and thus limit the penetration of earth working tools 18. Side frames 13 are provided with upstanding brackets 52. Pivotally supported from their upper ends at 54 are depending arms 53 provided with stops 55. The stops 55 each have an arcuate contact face representing the segment of a circle the center of which substantially coincides with the pivotal connection 54 of depending arms 53 and upstanding arms 52. The stops are provided for engaging rollers 56 journaled on stub shafts 57 carried by implement body B. Links 58 are pivotally connected at their rear ends to depending arms 53 at 59, and at their forward ends to crank arms 60 at 61, carried by crank shaft 30. When crank arms 60 are in the position shown in Figure 2, the under side of these arms are in contact with cross beam 12 thus establishing a limit to the downward movement of the rear end of crank arms 60, and the pivotal connection 59 to the center of crank shaft 30, thus providing a simple and efficient means for locking depending arm 53 in the position shown in Figure 2, and yet, because of the construction and arrangement of the contact face of stops 55 relative to pivotal connections 54 stops 55 may be very easily withdrawn from engagement with rollers 56. If desired, the focal point about which the arcuate contact face of stops 55 extends may be located slightly to the rear of the center of pivotal connections 54 and thus rollers 56 will have a tendency to roll off of stops 55, forcing depending arms 53 to swing forward and effect disengagement of stops 55 and rollers 56, but is prevented from doing so by the locking connection of links 58 with crank arms 60 as hereinbefore described. The advantage of this arrangement of parts resides in the fact that when the operator desires to release the implement body for free rotation he need only operate lever 34 slightly to break the locking action of links 58 with crank arm 60 and the disengagement of stops 55 and rollers 56 will thereafter be completed automatically without further effort from the operator.

The present invention is adapted to be disposed in the digging position of Figure 2, and may be disposed in the idle position of Figure 3, and it will be seen, by reference to Figures 2 and 3, that the implement body B is in the working position relative to draft frame F in both the digging and idle positions of the earth working implement. Herein lies one of the principal advantages of this invention. In earth working implements of the character described herein with which applicant is familiar, digging and idle positions are attained by disposing the implement body in one position relative to the draft frame for digging earth, and is disposed in still another position relative to the draft frame when idle, and when in idle position, the earth working tools are disposed above and rearwardly of the pivotal connection of the implement body with the draft frame and before the earth working tools can be disposed in digging position the earth working implement must be moved forward to revolve the implement body until the earth working tools are thereby brought into digging position. Thus it is difficult, if not impossible, to begin digging at a selected point in the line of travel because the operator must estimate at what point he will allow the implement body to begin revolving in order to bring the earth working tools into digging position at the desired spot at which digging is to begin. Still another disadvantage of this class of earth working implements as usually constructed resides in the difficulty of backing the implement into a corner against a bank and the like to begin digging and for the reasons heretofore explained.

In view of the discussion just concluded, a brief description of the use and operation of applicant's invention will suffice to point out the novelty and advantages thereof.

The earth working implement of the present invention being in the digging position shown in Figure 2, the machine is drawn across the surface of the earth and the earth working tools 18 will penetrate the ground to dig, loosen and otherwise cultivate the earth. In this, the digging position, lever 34 has been operated to rotate sleeve 31 on crank shaft 30 a limited distance, as defined by the over size openings 32 and pins 33, to withdraw the roller 43 from engagement with the upper end of arm 42 thus allowing the draft frame F to drop and bring earth working tools 18 in digging contact with the ground and as earth working tools 18 have been drawn into the ground by the advancing movement of the machine roller 43 has engaged stop 51 and thus limited the penetration of ground working tools 18. It should be noted at this point that all one must do to dispose the machine in the digging position of Figure 2 from the idle position of Figure 3, is to operate lever 34 to withdraw roller 43 from engagement with the upper end of arm 42 and earth working tools 18 will be disposed instantly in digging position. The earth working implement of the present invention being in the digging position shown in Figure 2, all that one must do to cause the device to be disposed in the idle position shown in Figure 3, is operate lever 34 to rotate crank shaft 30 to swing depending arms 53 to withdraw stops 55 from engagement with rollers 56 thus allowing implement body B to be revolved by the advancing movement of the implement whereby the tail piece 23 will be brought into contact with the ground under the implement and the rear end of draft frame F will be raised to the position shown in Figure 3 and roller 43 will again engage the upper end of arm 42 on the truck T and thus retain the draft frame F in the idle position. At the particular moment, during the revolving movement of implement body B, when tail piece 23 is in contact with the ground under the machine, standards 16 are extending forwardly in substantially parallel relation to the ground thus overbalancing the implement body for clockwise relation of its own accord independent of the advancing movement of the machine, which movement takes place when tail piece 23 has become disengaged with the ground, and the ground working tools are again thus disposed in working position relative to draft frame F, but the machine as a whole is in the idle position of Figure 3. It is obvious now, that the machine being in position shown in Figure 3, it may be backed into any position and, as heretofore explained, may be disposed instantly in digging position independent of the advancing movement of the machine.

Having thus described my invention, what I claim as new and useful is:

1. A machine of the character described comprising a frame, a wheeled truck, means mounting the frame on the truck for movement relative thereto, an implement body provided with a plurality of earth working tools and volute ground engaging means journaled on the frame to be revolved in unison by the advancing movement of the machine and adapted to thereby raise the frame, relative to the truck, a stop mounted on the truck and means mounted on the frame to automatically engage the stop and retain the frame in raised position.

2. A machine of the character described comprising a draft frame adapted at its front end for connection to a draft device, a wheeled truck disposed in the draft frame for movement relative thereto, a projection carried by the truck, a revolvable implement journaled on the draft frame for rotary movement comprising a body, a projection carried by the body, a plurality of earth working tools carried by the body, volute ground engaging means carried by the body and extending outside the confines of a circle embracing the earth working tools, the focal point of the circle being the pivotal connection of the revolvable implement with the draft frame, and means disposed on the draft frame for releasably engaging the projections on the truck and the revolvable implement.

3. A machine of the character described comprising a draft frame adapted at its front end for connection to a draft device to be drawn thereby over a surface, a wheeled truck, means mounting the draft frame on the truck for movement relative thereto, a revolvable implement journaled at its opposite ends on the draft frame for rotary movement comprising a body, a plurality of earth working tools mounted on the body, volute ground engaging means mounted on the body and projecting outside the confines of a circle embracing the earth working tools, the focal point of the circle being the pivotal connection of the revolvable implement with the draft frame, whereby as the revolvable implement is rotated by the advancing movement of the machine the volute ground engaging means will contact the ground and raise the draft frame, a projection mounted on the truck, and means mounted on the draft frame for releasably engaging the projection mounted on the truck to retain the draft frame in the raised position.

4. A machine of the character described comprising a frame adapted at its front end for connection to a draft device to be drawn thereby over a surface, a wheeled truck, means mounting the draft frame on the truck for movement relative thereto, a revolvable implement journaled at its opposite ends on the draft frame for rotary movement comprising a body, a plurality of earth working tools mounted on the body, volute ground engaging means mounted on the body and projecting beyond the confines of a circle embracing the earth working tools, the focal point of the circle being the pivotal connection of the revolvable implement with the draft frame, whereby as the revolvable implement is rotated by the advancing movement of the machine the volute ground engaging means will contact the ground and raise the draft frame relative to the truck, a projection mounted on the truck, means mounted on the draft frame to automatically engage the projection on the truck to retain the draft frame in raised position and operable to release the projection.

5. A machine of the character described comprising a draft frame adapted at its front end for connection to a draft device, a wheeled truck, means mounting the draft frame on the truck for movement relative thereto, a revolvable implement journaled at its opposite ends on the draft frame for rotary movement comprising a body, a plurality of earth working tools carried by the body, volute ground engaging means rigid with the body and projecting outside the confines of a circle embracing the earth working tools, the focal point of the circle being the pivotal connection of the revolvable implement with the draft frame, a projection carried on each of the opposite ends of the revolvable implement, means on the draft frame for releasably engaging the projections on the implement, a projection carried on the truck, and means on the draft frame for releasably engaging the projection on the truck.

6. A machine of the character described comprising a draft frame adapted at its front end for connection to a draft device to be moved thereby over a surface, a wheeled truck, means mounting the draft frame on the truck for movement relative thereto, a revolvable implement journaled at its opposite ends on the draft frame for rotary movement comprising a body, a plurality of earth working tools carried by the body, arcuate ground engaging means carried by the body and projecting outside the confines of a circle embracing the earth working tools, the focal point of the circle being the pivotal connection of the revolvable implement with the draft frame, whereby as the revolvable implement is rotated by the advancing movement of the machine the arcuate ground engaging means will contact the ground and raise the draft frame, a projection carried on the truck, means carried on the draft frame for releasably engaging the projection on the truck to retain the draft frame in the raised position, a projection carried on each of the opposite ends of the revolvable implement, and means carried on the draft frame for releasably engaging the projections carried on the revolvable implement to arrest rotation of the implement.

7. A machine of the character described comprising a draft frame adapted at its front end for connection to a draft device to be drawn over a surface, a wheeled truck, means mounting the draft frame on the truck for movement relative thereto, a revolvable implement journaled at its opposite ends on the draft frame for rotary movement comprising a body, a plurality of earth working tools mounted on the body, arcuate ground engaging means mounted on the body and projecting beyond the confines of a circle embracing the earth working tools, the focal point of the circle being the pivotal connection of the revolvable implement with the draft frame, whereby as the revolvable implement is rotated by the advancing movement of the machine the arcuate ground engaging means will engage the ground and raise the draft frame relative to the truck, a projection mounted on the truck, means mounted on the draft frame for engaging the projection on the truck to retain the draft frame in the raised position and operable to release the projection to drop the frame relative to the truck, a projection mounted on each of the opposite ends of the revolvable implement, and means mounted on the draft frame for engaging the projections on the revolvable implement and arrest rotation thereof and operable to release the projections for rotary movement of the implement.

8. A machine of the character described adapted to be disposed in digging and idle positions comprising a draft frame adapted at its front end for connection to a draft device to be drawn thereby over a surface to be treated, a wheeled truck, means mounting the draft frame on the truck for movement relative thereto, an implement journaled on the draft frame for rotary movement and provided with a plurality of earth working tools normally disposed beneath the implement in digging position, said implement being adapted to revolve from the digging position to thereby raise the draft frame relative to the truck and return the earth working tools to a position beneath the implement in idle position, a projection mounted on the truck, and means mounted on the draft frame for releasably engaging the projection on the truck to retain the draft frame in the raised position.

9. An implement of the character described comprising a rigid draft frame, a running gear unit articulately connected thereto, an earth working tool connected with the draft frame and revoluble about a horizontal axis, volute ground engaging means rigidly associated with said earth working tool and disposed substantially upon the opposite side of said revoluble axis, said volute means having a minor radius substantially equal to that of the earth working tools, and a major radius materially greater whereby rotation of the volute member around its axis will progressively elevate the draft frame and the earth working tools with relation to the running gear, means for locking the earth working tool and the draft frame in a digging relation to each other, means for locking the earth working tool and draft frame in a raised position relative to said running gear unit, and control means for actuating a second lock means to release the draft frame to permit it and the digging tool to move to a digging position.

CHARLES LE BLEU.